United States Patent

[11] 3,612,900

[72] Inventor Richard Davies
Timperley, England
[21] Appl. No. 867,834
[22] Filed Oct. 20, 1969
[45] Patented Oct. 12, 1971
[73] Assignee Ferranti, Limited
Hollinwood, England
[32] Priority Nov. 8, 1968
[33] Great Britain
[31] 53,001/68

[54] SHIFT REGISTER CIRCUIT
10 Claims, 6 Drawing Figs.

[52] U.S. Cl. 307/221, 307/233; 307/246; 307/251; 307/264; 307/269; 307/279; 307/304
[51] Int. Cl. G11c 19/00
[50] Field of Search 307/205, 221 C, 251, 233, 279, 264, 238, 269, 246, 304; 328/37

[56] References Cited

UNITED STATES PATENTS

| | | | |
|---|---|---|---|
| 3,508,074 | 4/1970 | Williamson | 307/304 X |
| 3,513,329 | 5/1970 | Washizuka et al. | 307/279 X |
| 3,523,284 | 8/1970 | Washizuka et al. | 307/221 X |
| 3,536,936 | 10/1970 | Rubinstein et al. | 307/279 X |
| 3,393,325 | 7/1968 | Borror et al. | 307/246 X |
| 3,395,291 | 7/1968 | Bogert | 307/246 X |
| 3,406,346 | 10/1968 | Wanlass | 307/304 X |
| 3,431,433 | 3/1969 | Ball et al. | 307/22 C |
| 3,483,400 | 12/1969 | Washizuka et al. | 307/238 X |
| 3,524,077 | 8/1970 | Kaufman | 307/246 |

OTHER REFERENCES

Sidorsky, MIOS Shift Registers, General Instrument Corporation Application Notes, Dec. 1967, pages 1- 3 relied on. 307/221 (C)

*Primary Examiner*—Stanley T. Krawczewicz
*Attorney*—Cameron, Kerkam & Sutton

ABSTRACT: A shift register circuit is connected so that it operates as a three-phase static shift register at low frequencies and as a two-phase dynamic shift register at high frequencies. The transition is achieved by producing a train of switching pulses having an amplitude dependent upon the pulse repetition rate of the two pulse trains from which they are derived, and using these variable-amplitude pulses to allow or prevent the operation of the shift register as a three-phase static circuit.

SHIFT REGISTER CIRCUIT

This invention relates to circuits for shift registers, and particularly to such circuits using semiconductor devices.

Shift registers take a number of different forms, and the present invention is concerned with the type composed of a plurality of binary cells in which bits are transferred from one cell to the next by the application of a pulse common to all cells. In semiconductor shift registers of this type the binary cells are connected in series with one another through first switches, each binary cell usually comprising two invertor stages connected in series with one another through second switches. All the first switches are triggered together by a first switching pulse, and all the second switches are triggered together by a second switching pulse. In practice the first and second switching pulses are repetitive, in the form of first and second trains of switching pulses.

This general description of the shift register has to be further extended to describe the two main types, referred to generally as "static" and "dynamic" shift registers. In the static shift register each binary cell as described above is provided with a connection between its output and its input, through a third switching device. Thus the two invertor stages are cross-coupled and form, in effect, a bistable device. Storage of bits may then take place since one of the two invertor stages will always be conducting. The third switches are all operated simultaneously by a third train of switching pulses. Such a shift register is described in U.S. Pat. Nos. 3,406,346 and 3,483,400.

On account of the storage method employed in the static shift register circuit, the operating speed has a range extending from zero Hz. (i.e. DC conditions) to a maximum frequency determined by the circuit characteristics, usually about 1.5 MHz.

The dynamic type of shift register is intended to operate at higher speeds, and uses the basic circuit previously described. Storage of bits takes place in the input capacitance of each binary cell, and this imposes a lower frequency limit at which the circuit may operate, usually about 3 The upper limit depends largely upon the characteristics of the semiconductor device, and may be of the order of 2 MHz. A dynamic shift register is described in U.S. Pat. Nos. 3,524,077.

A further classification of shift register types takes into account the number of pulse trains necessary to operate the shift register. Hence the static shift register referred to above may be called a "three-phase static" shift register if three pulse trains are required to operate it. Similarly, the dynamic shift register referred to may be called a "two-phase dynamic" shift register. There are also other types of shift register, such as the "two-phase static" and "four-phase dynamic" types. Frequently only two pulse trains are applied to the shift register, any further pulse trains being generated internally.

The types of shift register referred to above have their own attendant disadvantages. The two-phase dynamic shift register has a high lower frequency limit, whilst the three-phase static shift register has a low upper frequency limit. The two-phase static shift register has a wide operating range, but uses more components and dissipates more energy than the other two types. The problem of energy dissipation is of particular importance when the shift registers are made in integrated circuit form.

An object of the invention is to provide a shift register having a wide operating frequency range which does not suffer from the above-mentioned disadvantages.

According to the present invention there is provided a shift register which includes a plurality of binary cells each cell being connected in series with another through a first switching device, each binary cell comprising two invertor stages each invertor stage having an input capacitance and each binary cell having the output of the first invertor stage connected to the input of the second invertor stage through a second switching device and the output of the second invertor stage connected to the input of the first invertor stage through a third switching device, sources of first, second and third trains of switching pulses of the same pulse repetition rate for operating all of the first, second and third switching devices respectively to cause the shift register to operate as a three-phase static shift register, and means for so controlling the magnitude of the pulses making up the third train of switching pulses in dependence upon the repetition rate of the pulses that at a pulse repetition rate above a threshold value determined by the input capacitance of each invertor stage the third switching devices become ineffective and the shift register operates as a two-phase dynamic shift register.

An embodiment of the invention will now be described with reference to the accompanying drawings, in which.

Figure 3A:
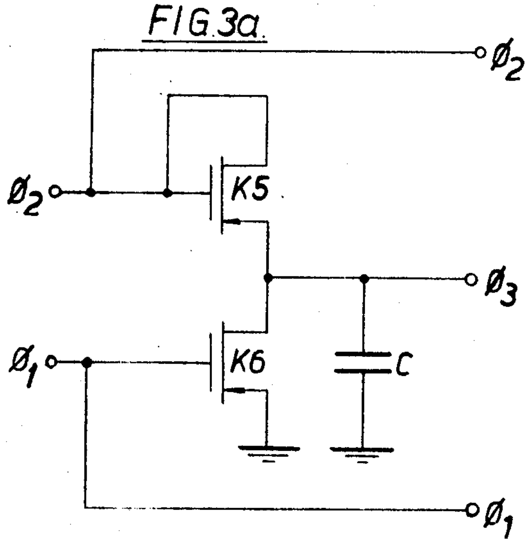
Figure 3B:
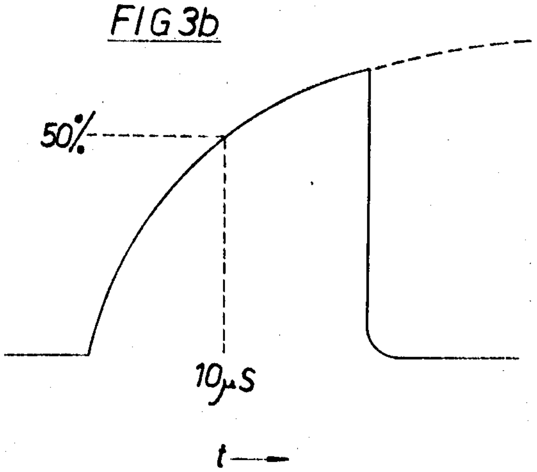
Figure 4A:
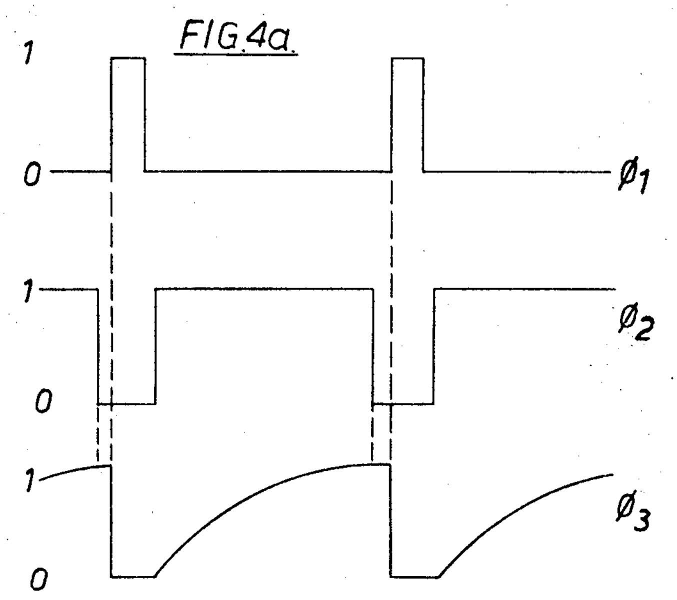
Figure 4B:
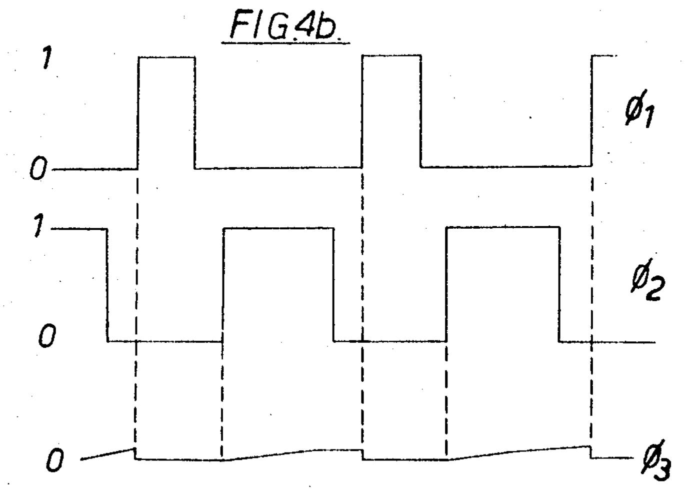

FIGS. 3*a* and 3*b* illustrate respectively a circuit used to produce the third train of switching pulses, and the pulse waveform so produced; and FIGS. 4*a* and 4*b* illustrate typical pulse waveforms applied to the shift register.

Figure 1:
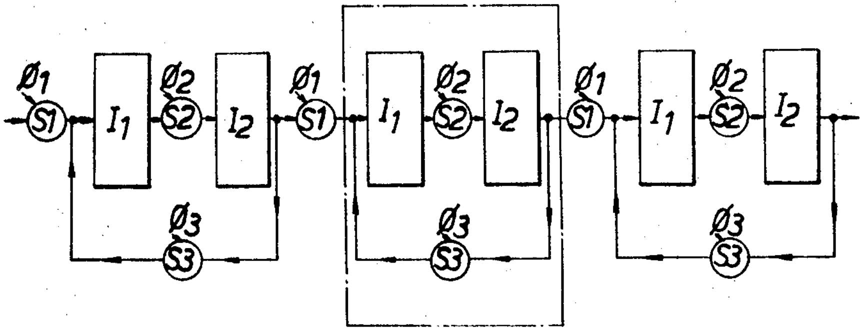
FIG. 1 is a schematic block diagram of part of a shift register.

Referring now to FIG. 1, this shows a block diagram of three binary cells of a shift register. One of the cells is shown in side the broken outline. Each binary cell comprises two invertor stages $I_1$ and $I_2$ connected in series with one another through a switching device S2. This switching device has applied to it switching pulses $0_2$. The two invertors are also cross-coupled through a switching device S3 controlled by switching pulses $0_3$. Each such cell is connected to the next through a switching device S1 which is controlled by switching pulses $0_1$.

Figure 2:
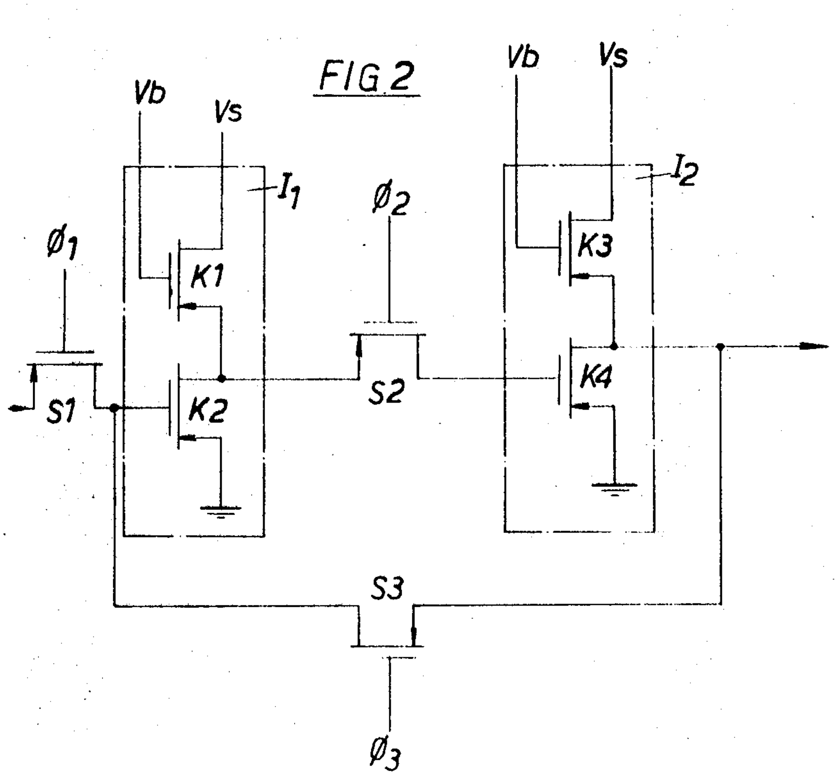
FIG. 2 is a circuit diagram of one binary cell and switching means.

FIG. 2 shows a circuit diagram of one binary cell of the shift register. This uses insulated-gate field-effect transistors, hereinafter referred to as IGFETs, for the switches and the invertor stages. The output of the previous binary cell is applied to the source electrode of an IGFET S1, forming the first switch, which has the $0_1$ switching pulses applied to its gate electrode as shown. The drain electrode of S1 is connected to the input of the binary cell and the first invertor stage $I_1$. The invertor stage consists of two IGFETs connected in cascade. The first IGFET K1 has its drain electrode connected to a supply potential Vs and its gate electrode connected to a bias potential Vb. The source electrode of K1 is connected to the drain electrode of the second IGFET K2, which has its source electrode connected to earth potential. The gate electrode of K2 is the input of the invertor stage, and is connected to the drain electrode of S1.

The output of the first invertor stage is taken from the connection between K1 and K2, and is applied to the source electrode of an IGFET S2, forming the second switch. This has the $0_2$ switching pulses applied to its gate electrode, and has its drain electrode connected to the second invertor stage $I_2$. The second invertor stage $I_2$ is identical to the first stage, comprising two IGFETs K3 and K4 connected in the same manner. Hence the drain electrode of S2 is connected to the gate electrode of K4. The output of the second invertor stage, which forms the output of the binary cell, is taken from the connection between K3 and K4. Also connected to this point is the third switch, in the form of an IGFET S3. The source electrode of S3 is connected to the output of the second invertor stage $I_2$, and the gate electrode of S3 is connected to the $0_3$ switching pulses. The drain electrode of S3 is connected to the input of the first invertor stage $I_1$ to complete the cross-connection.

In the IGFET the gate electrode is insulated from the other electrodes, and this provides the necessary input capacitance for each invertor stage.

It is common practice to supply only two trains of switching pulses to the shift register from a clock pulse generator, and to generate the third pulse train within the shift register. FIG. 3*a* illustrates the basic circuit used to develop the $0_3$ pulse train from the $0_1$ and $0_2$ pulse trains. As FIG. 3*a* shows, two IGFETs K5 and K6 are used, each having one of the $0_1$ and $0_2$ pulse trains applied to its gate electrode. The IGFET K5 has its drain connected to its gate, and has its source connected to the drain of the other IGFET K6. The source of K6 is connected to earth potential. The output of the circuit is obtained from the connection between the source of K5 and the drain of K6, and a capacitor C is connected between this point and earth potential. In practice the capacitor C may represent the total capacitance of the $0_3$ pulse line.

The circuit of FIG. 3*a* is basically a switching circuit which either allows the capacitor C to charge through K5 or discharges it through K6. The $0_1$ and $0_2$ pulses are arranged so that they do not overlap; thus during the period of the $0_2$ pulse, K5 conducts and the capacitor C charges up. The IGFET K5 is arranged to have a relatively high resistance when it is conducting so that the time constant of the charging circuit is relatively large; for example, the time taken to charge C to 50 percent of its maximum voltage may be $10\mu$ S. When the $0_2$ pulse ceases the charge on C is held until the other IGFET K6 conducts at the beginning of the following $0_1$ switching pulse. The IGFET K6 has a relatively low resistance when conducting, and hence the discharge circuit of the capacitor has a short time constant, leading to a rapid discharge of the capacitor. FIG. 3*b* illustrates the waveform of a $0_3$ pulse.

The magnitude of the $0_3$ pulse is related to its duration by an exponential law, hence as the duration decreases, so the magnitude also decreases. The duration of the $0_3$ pulse is directly related to the duration of the $0_2$ pulse as explained above, and hence the magnitude of the $0_3$ pulse will decrease as the $0_2$ pulse repetition rate increases. The circuit of FIG. 3*a* may be modified in various ways, but it remains basically of the same form, with the output capacitor C charged and discharged under the control of the $0_1$ and $0_2$ waveforms.

Referring now to FIGS. 1 and 4*a*, at low pulse repetition rates the $0_1$ and $0_2$ pulses are of relatively long duration. FIG. 4*a* shows typical values. At a pulse repetition rate of 20 kHz. for example, the $0_2$ pulses have a duration of about $40\mu$ S. This gives capacitor C a charging time of the same order. Since this time is very much greater than the time constant of the charging circuit, the $0_3$ pulse will reach almost maximum magnitude and will operate the gates S3. Hence at low pulse repetition rates, and this applies right down to DC conditions, the shift register operates as a conventional three-phase static shift register.

When the pulse repetition rate reaches a threshold value the input capacitance of each invertor stage is able to act as bit storage, and the circuit will then operate as a dynamic shift register. The switches S3 are therefore no longer required, and the $0_3$ pulse generating circuit is arranged so that the magnitude of the $0_3$ pulses becomes too small to operate the switches S3. The pulse rate threshold value at which this occurs is determined by the input capacitance of each invertor stage.

Referring again to FIG. 4*a* it will be seen that as the pulse repetition rate increases so the duration of the $0_1$ and $0_2$ pulses will decrease. Hence the duration of the $0_3$ pulse will decrease, and with it the magnitude of the pulse. For example, when the duration of the $0_2$ pulse, and hence that of the $0_3$ pulse, falls to about $10\mu$ S, then the magnitude of the $0_3$ pulse rises to only about 75 percent of its maximum value. At a pulse repetition rate of 1 MHz, the magnitude of the $0_3$ pulse rises to only about 10 percent of its maximum value, as shown in FIG. 4*b* to a different scale. When the pulse rate rises to a value above the threshold value the operation of the switches S3 becomes erratic. However, at the pulse repetition rates at which this occurs the circuit of FIG. 1 is already operating as a two-phase dynamic shift register without requiring the cross-connection through the switch S3. As the pulse repetition rate rises still further the magnitude of the $0_3$ pulses becomes such that the S3 switches cease to operate at all, remaining open at all times. The circuit is then that of the two-phase dynamic shift register, relying for its operation on the input capacitance of each invertor stage.

The details of pulse lengths and operating frequencies given above are only by way of example.

The circuit described above for generating the $0_3$ switching pulses dissipates very little power, since the two IGFETs are never both conducting at the same time.

A shift register of the type described above readily lends itself to production in integrated-circuit form.

The shift register described need not be constructed from IGFETs. However, if other types of devices are used it is necessary to ensure that the required input capacitance is provided to enable the two invertor stages making up a binary cell to operate in the two-phase dynamic mode at higher frequencies as described above.

What we claim is:

1. A shift register which includes a plurality of binary cells each cell being connected in series with another through a first switching device, each binary cell comprising a first and a second invertor stage each invertor stage having an input capacitance, a second switching device and a third switching device, each binary cell having the output of the first invertor stage connected to the input of the second invertor stage through said second switching device and the output of the second invertor stage connected to the input of the first invertor stage through said third switching device, sources of first, second and third trains of switching pulses of the same pulse repetition rate for operating all of the first, second and third switching devices respectively to cause the shift register to operate as a three-phase static shift register, and means for so controlling the magnitude of the pulses making up the third train of switching pulses in dependence upon the repetition rate of the pulses that at a pulse repetition rate above a threshold value determined by the input capacitance of each invertor stage the third switching devices become ineffective and the shift register operates as a two-phase dynamic shift register.

2. A shift register as claimed in claim 1 in which the source of the third train of switching pulses includes means for deriving said third train of switching pulses from the first and second trains of switching pulses.

3. A shift register as claimed in claim 2 in which the means for controlling the magnitude of the pulses making up the third of switching pulses comprises a capacitor and circuit means for charging said capacitor during each successive pulse of one of the first and second trains of switching pulses and for discharging the capacitor during each successive pulse of the other train of switching pulses, pulses of the third train of switching pulses being developed across the capacitor.

4. A shift register as claimed in claim 3 in which the circuit means include a relatively high impedance through which the capacitor is charged and a relatively low impedance through which the capacitor is discharged.

5. A shift register as claimed in claim 1 in which each invertor stage has the input capacitance formed by the gate to source capacitance of an IGFET.

6. A shift register as claimed in claim 4 in which the relatively high and relatively low impedances are each provided by a separate one of a pair of cascade-connected insulated-gate field effect transistors.

7. A shift register as set forth in claim 6 wherein said capacitor is connected between the junction of the drain and source electrodes of said cascade connected transistors and ground potential and means for applying said first train of switching pulses to the gate of one of said transistors and said second train of switching pulses to the gate of the other transistor of said pair to thereby develop said third pulse train.

8. A shift register adapted for operation as a three-phase static shift register at a first frequency range and a two-phase dynamic shift register at a second higher frequency range comprising a plurality of binary cells each cell being connected in series with another through a first switching device, each binary cell comprising a first and a second invertor stage each invertor stage having an input capacitance, a second switching device and a third switching device, each binary cell having the output of the first invertor stage connected to the input of the second invertor through said second switching device and the output of the second invertor stage connected to the input of the first invertor stage through said third switching device, sources of first, second and third trains of switching pulses of the same pulse repetition rate for operating all of the first, second and third switching devices respectively to cause the shift register to operate as a three-phase static shift register, and means for causing said shift register to operate as a two phase dynamic shift register including circuit means for producing said third train of switching pulses, said third train of switching pulses having an amplitude dependent upon the repetition rate of the first and the second trains of switching pulse and being applied to said third switching devices to render the third switching devices ineffective when said pulses are of a predetermined amplitude.

9. A shift register as claimed in claim 8 in which the circuit means for producing the third train of switching pulses comprises a relatively high and low impedance circuit means for charging said capacitor during each successive pulse of one of the first and second trains of switching pulses and for discharging the capacitor during each successive pulse of the other train of switching pulses, pulses of the third train of switching pulses being developed across the capacitor.

10. A shift register as claimed in claim 9 in which the relatively high and relatively low impedance circuit means are provided by a separate one of a pair of cascade-connec-insulated-gate field effect transistors, said capacitor being connected between the junction of the drain and source electrodes of said cascade-connected transistors and ground potential and means for applying said first train of switching pulses to the gate of one of said transistors and said second train of switching pulses to the gate of the other transistor of said pair to thereby develop said third pulse train.

UNITED STATES PATENT OFFICE
CERTIFICATE OF CORRECTION

Patent No. 3,612,900 Dated October 12, 1971

Inventor(s) Richard Davies

It is certified that error appears in the above-identified patent and that said Letters Patent are hereby corrected as shown below:

Column 1, line 39, after "3" insert -- kHz. --. Column 2, lines 27, 29, 30, 36, 50, 60, 70, 71 and 72, column 3, lines 7, 10, 11, 16. 18, 22, 23, 25, 26, 27, 31, 33, 35, 38, 47, 48, 53, 54, 56, 57, 59 and 67, and column 4, line 1, "O", each occurrence, should read -- Ø --.

Signed and sealed this 27th day of June 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334